United States Patent
Toh (10) Patent No.: US 6,838,650 B1
(45) Date of Patent: Jan. 4, 2005

(54) CONFOCAL IMAGING (75) Inventor: Peng Seng Toh, Singapore (SG)

(73) Assignee: Agilent Technologies, Inc., Palo Alto, CA (US)

( * ) Notice: Subject to any disclaimer, the term of this patent is extended or adjusted under 35 U.S.C. 154(b) by 252 days.

(21) Appl. No.: 10/130,511

(22) PCT Filed: Nov. 16, 2000

(86) PCT No.: PCT/SG00/00188

§ 371 (c)(1),
(2), (4) Date: May 16, 2002

(87) PCT Pub. No.: WO01/37025

PCT Pub. Date: May 25, 2001

(30) Foreign Application Priority Data

Nov. 16, 1999 (SG) .......................................... 9905676-4

(51) Int. Cl.[7] .............................................. G02B 27/64
(52) U.S. Cl. .................................. 250/201.3; 250/208.1
(58) Field of Search .......................... 250/201.3, 208.1; 356/609

(56) References Cited

U.S. PATENT DOCUMENTS 5,248,876 A * 9/1993 Kerstens et al. ........ 250/559.05

* cited by examiner

Primary Examiner—Que T. Le
Assistant Examiner—Michael P. Mooney (57) ABSTRACT

A confocal imaging system for imaging a surface. The system includes an area array sensor having rows of sensors for detecting light reflected from the surface, and an optical system arranged to focus light from different focal planes on the surface to different sensor rows of the area array sensor.

8 Claims, 7 Drawing Sheets

CONFOCAL IMAGING

This invention relates to a system for high speed and high resolution confocal imaging for three dimensional measurement.

BACKGROUND

The measurement of three dimensional features on a surface has many applications. One particular example is in the inspection of electronic components and electronic component assemblies.

The most common three dimensional inspection techniques available are optical techniques. These optical inspection techniques fall into several categories, including for example, structured light imaging, interferometry imaging, and triangulation imaging. There are drawbacks with each of these categories. One of the primary drawbacks is that the techniques are highly dependent on the reflective nature of the object under inspection. For example, when an object has specular surfaces, the triangulation imaging techniques which relies on true reflections will not work properly. Furthermore, when an object is surrounded by tall components, it may cause occlusion in the triangulation imaging technique. A drawback with the interferometry imaging technique is that the measurement results are wrapped in a $2\pi$ image space. Effective measurement of objects with large steps and isolated areas is difficult with interferometry based systems.

A further category of optical inspection techniques is confocal imaging. The confocal method for three dimensional inspection does not suffer from the above mentioned problems associated with triangulation and interferometry imaging techniques.

Figure 1:
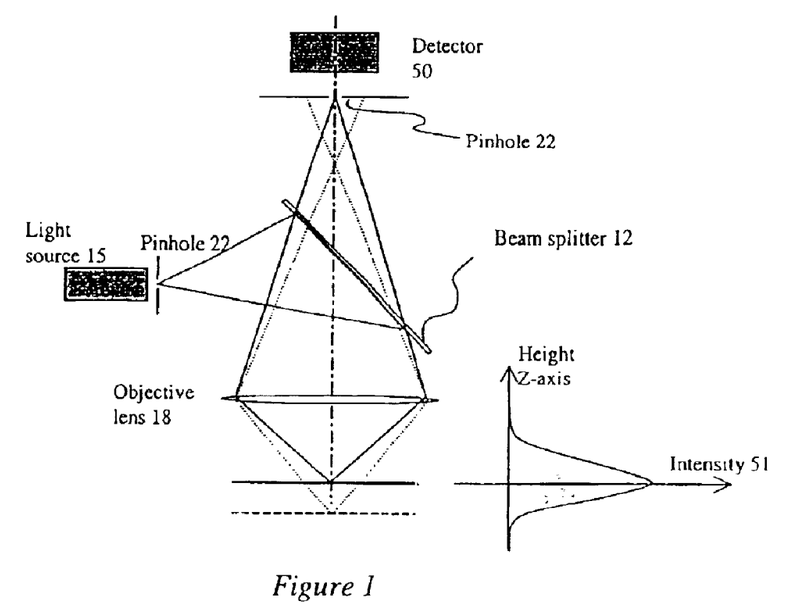
FIG. 1 is an illustration of a conventional confocal microscope.
Figure 2:
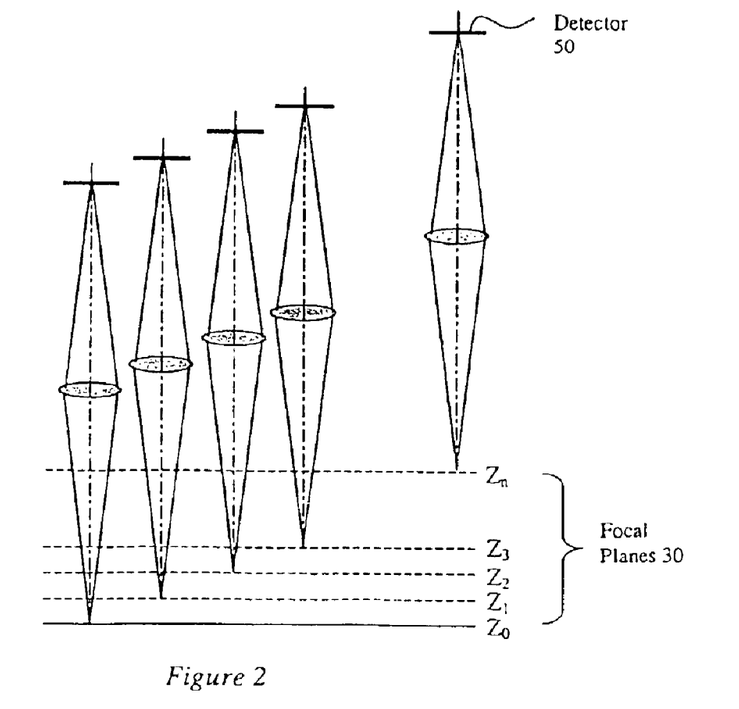
FIG. 2 illustrates the concept of imaging at different focal planes.

FIG. 1 illustrates the principles of a confocal microscope. The microscope focuses light from a light source 15 onto a point at a preset focal distance from the objective lens 18. At the same time a detector 50 in the microscope detects light emitted from that same point at the same focal distance from the objective lens.

If an object is present at the preset focal distance of interest, the so-called Z distance, then the light from the light source will be incident on the object as an intense focussed spot. This intense focussed spot re-emits light by reflection and dispersion and the emitted light is detected as a high intensity peak 51 by the detector 50.

If, on the other hand, an object is located above or below the preset focal distance of interest then light from the light source will be spread over a wider circle on the object surface. Light re-emitted from the object surface, being outside the focal plane of interest, is less likely to reach the detector 50 and hence a lower intensity 51 is detected.

Confocal imaging systems only "see" structures located in the focal plane under inspection. In other words, structures located out of the focal plane are much less visible to the confocal system. Extremely good spatial (x, y) and height (z) resolution can be attained by confocal measurement. However, a drawback with the confocal method is that it is generally time consuming. Traditional confocal microscopes typically take several tens of seconds to measure per field of view. This is mainly due to the need to acquire multiple images of the field of view, each image being associated with a particular focal plane setting.

Conventional confocal microscopes use one of the following different scanning mechanisms to obtain the multiple images of a scene. These multiple images are slices or optical sections corresponding to different focal planes of the scene. Two typical scanning approaches are the spinning Nipkow disk, and axial scanning by moving the z stage. The scanning movements associated with the acquisition of multiple images are major time-consuming activities. Furthermore, in the Nipkow disk system, the disk limits the light efficiency which results in the need for very sensitive photo sensors which can considerably increase the cost of the system.

A number of publications suggest improvements to the conventional confocal microscope which are designed to enhance measurement speed. U.S. Pat. No. 5,737,084, for example, describes a means for changing the distance in the Z direction between the object and the object-position-in-focus, instead of the object stage moving in the Z direction. This means is achieved by the use of plurality of transparent flat plates between the objective lens and the object-position-in-focus in turn.

U.S. Pat. No. 5,880,465 describes a confocal microscope with low mass objective that is driven in one or more axis to improve the speed of scanning.

U.S. Pat. No. 5,847,867, assigned to Yokogawa Electric of Japan, describes a confocal microscope comprising a confocal laser scanner which rotates a Nipkow disk at high speed together with microlenses to improve light use efficiency.

These improvements are aimed at reducing the scanning time for obtaining slices of images at different focal plane. Another objective of these, improvements is to increase the light use efficiency. However, these improvements result in complex systems which are in general not fast enough for real time production measurement and inspection applications.

When imaging a surface area that is larger than the field of view of the confocal microscope, two degrees of lateral scanning movement, usually referred to as X and Y motion, are generally required. The X and Y motions are relative motions between the confocal microscope and the surface under inspection, and are typically performed by moving either the confocal microscope or the surface. In order to obtain a full three dimensional image at multiple focal planes, Z motion is also required in addition to the X and Y motions. Thus, a conventional confocal microscope needs three degrees of motion to achieve full acquisition of three dimensional data from an object or surface. These 3 motions are the focal plane scanning motion, X scanning motion, and Y scanning motion.

SUMMARY OF THE PRESENT INVENTION

It is an object of the present invention to provide a confocal imaging system in which a reduced number of degrees of motion is needed to acquire three dimensional measurements of a surface under inspection.

It is a further objection of the present invention to provide a confocal imaging system which is less complex and thus simpler and less expensive that existing confocal imaging systems.

Preferred embodiments of the present invention are designed so as to integrate one of the X or Y scanning motions with the focal plane or Z scanning motion. In this way, the imaging system can improve the speed of scanning and can avoid the need for separate means for Z motion.

In order to achieve the objects of the present invention, the field of view is preferably imaged onto an array image sensor. In accordance with the invention, multiple rows of sensing elements are provided in the confocal imaging system such that each row focuses on a different focal plane of the surface under inspection. In other words, different focal planes of the surface can be imaged simultaneously using different rows of the area image sensor. A row of object points in the object space is imaged onto a corresponding row of imaging sensor elements on the array image sensor.

One axis of the object motion and the focal planes scanning motion is combined into a linear scanning motion. The linear scanning motion accomplishes two objectives: a) generating relative motion between the object and the confocal system so that a large area can be scanned, and b) generating relative motion between the object and the confocal system such that all object points are imaged at multiple focal planes.

A further object of the present invention is to increase the flexibility of confocal imaging by the use of image processing means. Typical confocal microscopes are hardware oriented, mainly optics and electronics, which do not lend themselves to programmability and flexibility of use. The present invention preferably uses an area array image sensor with signals from the sensor being captured or acquired by a processor. Digital acquisition of image signals in this way allows for greater programmability. For example, specific areas of interest can be measured instead of the entire field-of-view so as to reduce the confocal measurement time.

Yet another objective of the invention is to provide scalability in terms of resolution and accuracy. This objective can be accomplished by the present invention using two different approaches. One is through image processing means and the other is by swapping the microlens/pinhole array. The first approach is used when the changes in resolution is rather small. The second approach is applied when drastic changes in the z resolution is required.

Confocal imaging systems in accordance with the present invention are capable of obtaining both a two dimensional image and height (Z axis) information. A combination of the two dimensional image and the height (Z axis) information lead to the formation of a full three dimensional image.

The Z height of any object point can be computed by locating the maximum intensity within the corresponding series of focal plane images. Better accuracy than the discrete focal plane resolution can be obtained by computing the theoretical maximum point between adjacent discrete data. Various characteristics of two dimensional images can be computed. For two dimensional imaging, an extended depth-of-field image that covers the entire Z dynamic range of the confocal system can be computed by successively shift and add the series of image sequence. Other two dimensional images with different degree of depth-of-field can be computed by stitching the appropriate rows together.

DESCRIPTION OF A SPECIFIC EMBODIMENT

Confocal Imaging System

Figure 3:
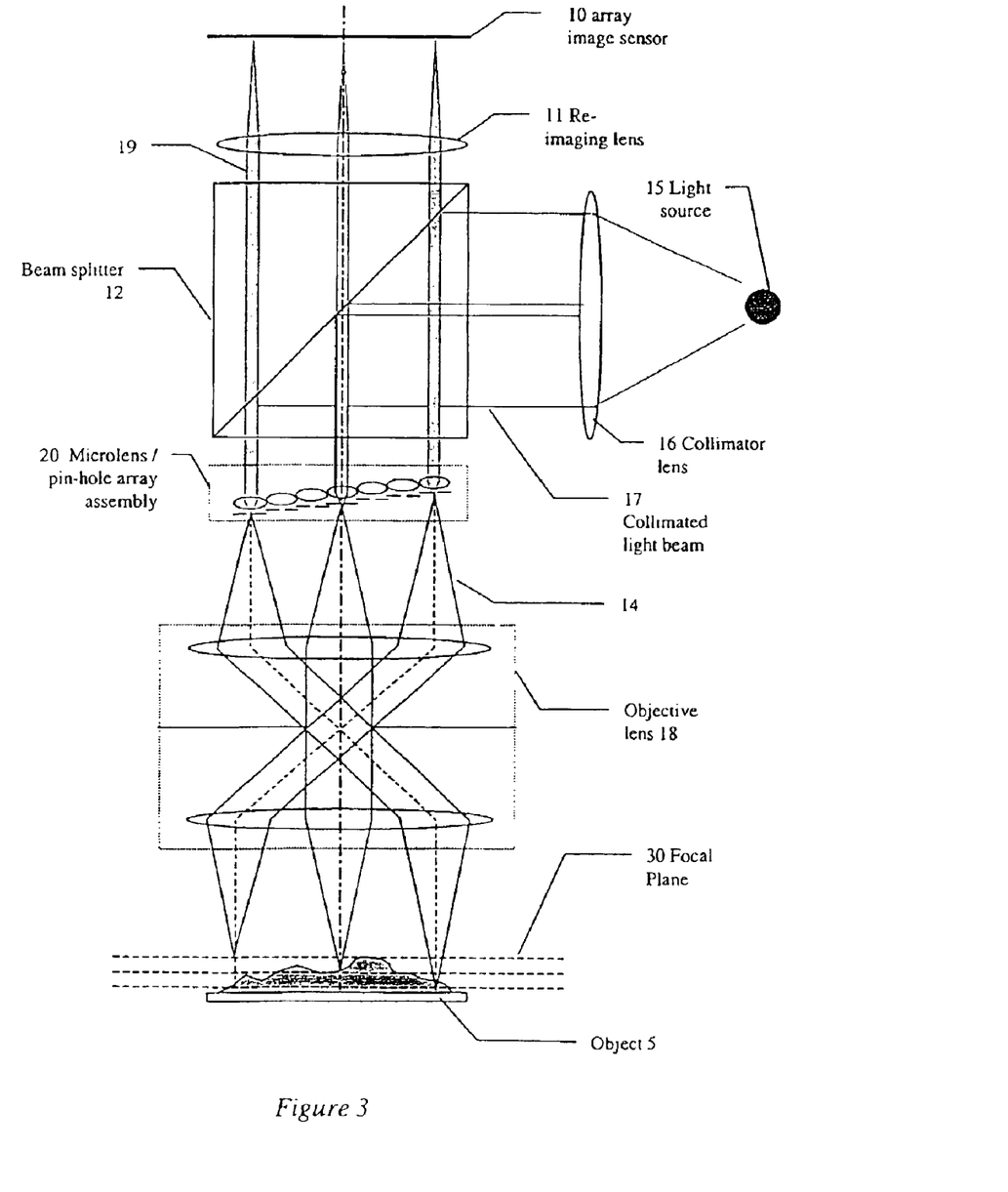
FIG. 3 is an optical block diagram of a confocal imaging system in accordance with the present invention.

Referring to FIG. 3, there is shown a confocal imaging system for inspecting an object 5 to determine the three dimensional surface structure of the object. The confocal imaging system comprises a light source 15, and a collimator lens 16 for refracting light from the light source into a collimated light beam 17. The collimated light beam 17 is reflected by a beam splitter 12 along an axis of the confocal imaging system towards a microlens and pinhole array assembly 20. This axis is the Z axis of the confocal imaging system on which the remaining optical components are aligned.

The microlens and pinhole array 20 comprises a plurality of array elements, each element comprising a single microlens positioned in registry above a single pinhole. The collimated light beam reflected by the beam splitter 12 simultaneously illuminates all the elements of the microlens and pinhole array 20. Looking at just a single element of the array, the microlens of that element focuses the collimated light 17 through the pinhole of that element and onto an objective lens 18 assembly. The objective lens 18 focuses the light from the microlens on a unique point of interest in three dimensional space.

Light which appears to be emitted from the unique point of interest is focussed back onto the same element of the microlens and pinhole array. The emitted light is focussed onto the pinhole so that it passes through the pinhole and onto the microlens. The microlens collimates the emitted light which then passes through the beam splitter 12 onto a re-imaging lens 11. The re-imaging lens 11 focusses the emitted light onto a single detector element of an array image sensor 10. The single detector element is positioned to enable cooperation with the associated element of the microlens and pinhole array.

Each element of the microlens and pinhole array 20 has an associated element on the array image sensor 10. A single pair of elements from the array image sensor and the microlens and pinhole array, in conjunction with the remaining features of the system, provides a discrete confocal measurement system having an associated point of interest in three dimensional space. Thus, the full set of element pairs provides a corresponding set of points of interest in three dimensional space.

The array image sensor 10 is preferably a Charge Coupled Device (CCD) which is cooled to improve sensitivity. The light source 15 used in the preferred embodiment is a white light source such as metal-halide lamp or xenon-arc lamp. High intensity output can be produced by these types of lamp. The collimator lens 16 produces largely parallel light rays 17 in order to increase the light use efficiency of the system.

Microlens and Pinhole Array

A more detailed view of the microlens and pinhole array 20 is shown in FIGS. 4(a) and 4(b). From the plan view in FIG. 4(a) it can be seen that the elements of the array are uniformly arranged in rows and columns to form a grid-like arrangement.

More specifically, the elements of the array are preferably arranged in seven rows 26, with each row containing six regularly spaced elements.

The rows 26 of microlens 24 and pinhole 22 elements are staggered at different heights as measured on the Z axis of the system. Preferably, the furthest left row is the lowest row. The adjacent row to the right is then raised by a height D'. The next row and each successive rows to the right are each raised by the height D' such that the furthest row on the right is raised by a total height of C' over the furthest row on the left. The total height difference C' is accordingly equal to 6 times D'.

The height of a row effects the focal plane or Z axis height of the points of interest for the microlens 24 and pinhole 22 elements in that row. By having the rows positioned at progressively different heights, each row of elements can focus on a different focal plane above the object.

FIG. 3 illustrates the three distinct focal planes associated with the farthest left row, the central row, and the farthest right row. The farthest left row is the lowest row which has its points of interest located in the lowest focal plane above the object 5. The farthest right row is the highest row which has its points of interest located in the highest focal plane above the object 5. The central row has its points of interest located in a focal plane equidistant from the lowest and highest focal planes.

In accordance with the principle of operation of a confocal microscope, the greatest detection intensity will occur when the position of a surface of the object 5 coincides with one of the set of points of interest in three dimensional space for the confocal imaging system. By scanning the confocal imaging system from left to right over a point on the object surface, one of the rows of detecting elements may have a focal plane Z height which matches the Z height of the surface, such that the greatest detection intensity can be detected. The focal plane associated with that maximum in the detection intensity will then provide a measure of the height of the surface at that point. Similar measurements performed at different points on the object surface can be used to build up a full three dimensional picture of the surface.

Figure 4:
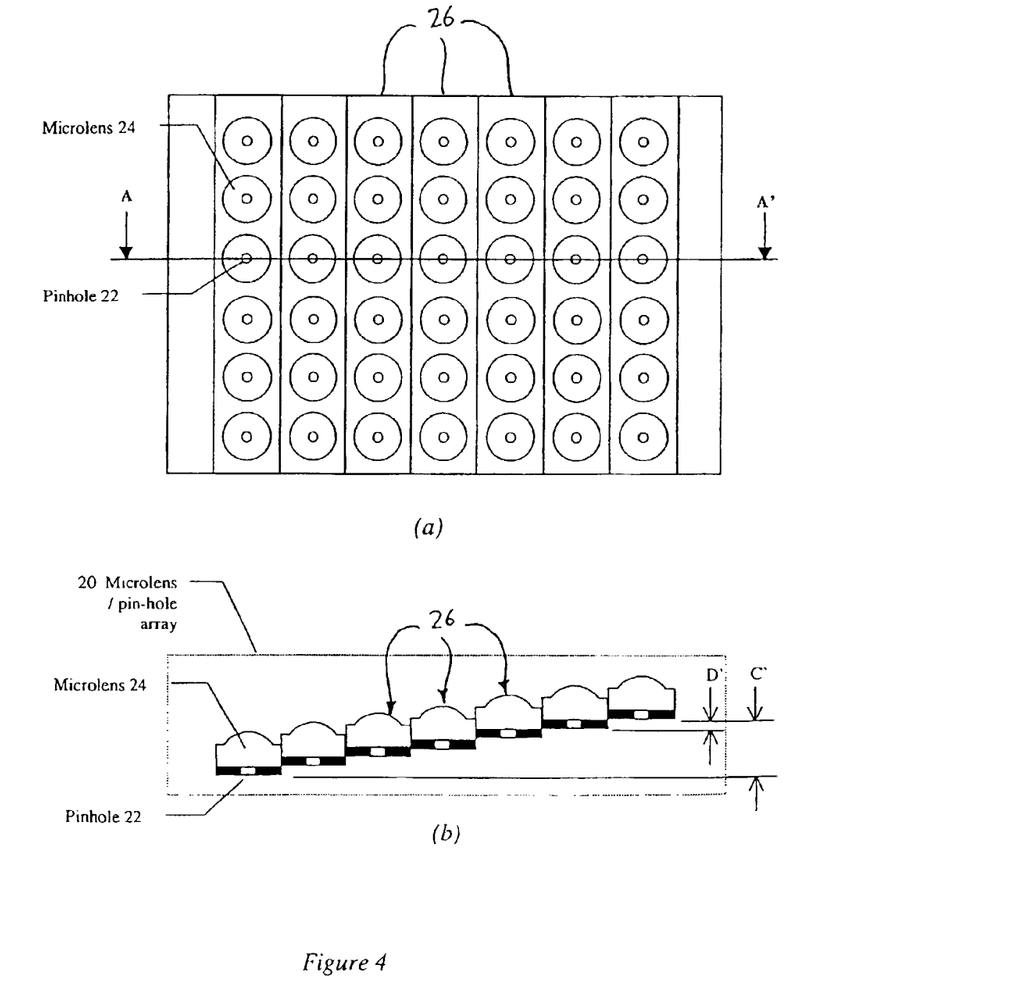
FIG. 4(a) is a plan view of a microlens and pinhole array for use in the confocal imaging system of FIG. 3.
FIG. 4(b) is a cross-sectional view A—A' of the microlens and pinhole array of FIG. 4(a).
Figure 5:
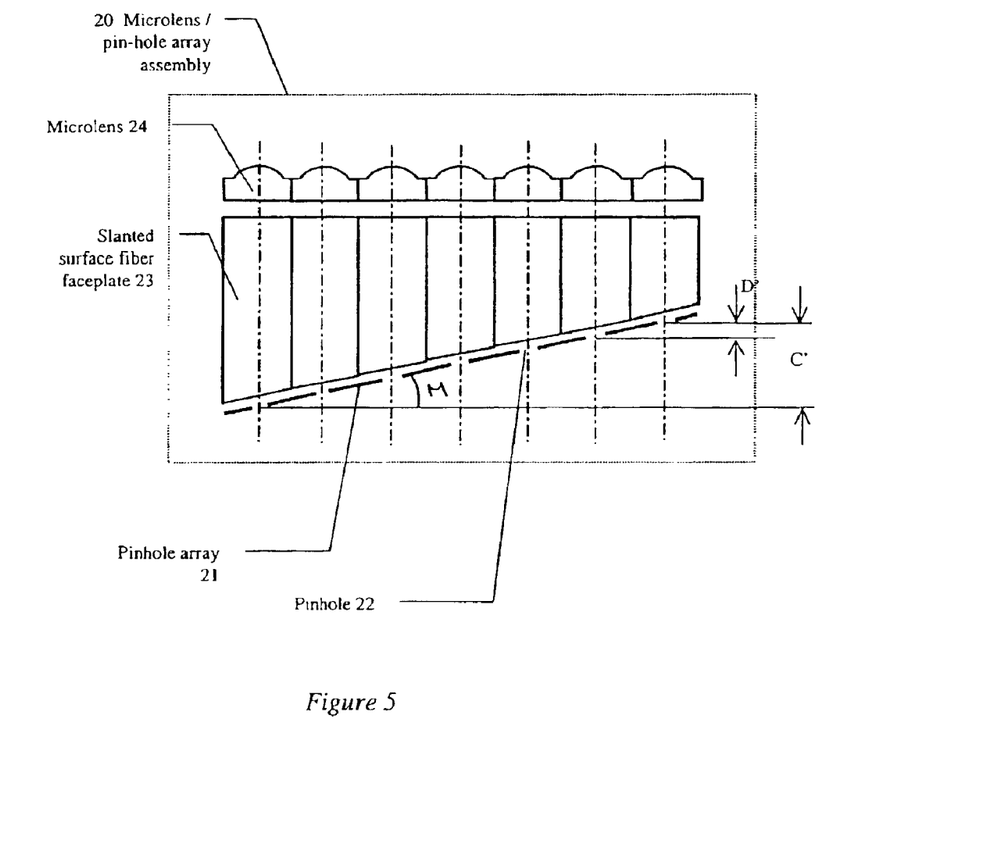
FIG. 5 shows an alternative design of the microlens and pinhole array for use in the confocal imaging system of FIG. 3.

Microelectronics fabrication technology may be used to produce the miniature lens 24 and pinhole 22 of FIG. 4 with precision height control. FIG. 5 shows an alternative way of implementing the microlens and pinhole array assembly 20. The assembly comprises a pinhole array 21 which can be fabricated by electroplating a glass substrate. The pinholes are formed by the unmasked clear opening on the glass substrate. The glass substrate pinhole array 21 is then tilted at a angle, M, with respect to the X, Y plane to create the required D' steps between adjacent rows of pinholes 22. An imaging conduit 23, commonly known as fiber optic faceplate, is used to transmit the light passing through the glass substrate pinhole array 21 to the upper surface of the image conduit 23. The lower surface of the image conduit 23 is ground and polished with a slanted surface to match that of the glass substrate pinhole array 21. On the upper surface of the image conduit 23, a microlens array 24 is used to collimate the transmitted light towards the beam splitter 12. In this way, the fabrication of the microlens array 24 and the pinhole array 21 can be separated and still achieve the required purpose. Each of these components: the microlens array 24, the pinhole array 21, and the slanted surface image conduit 23 are readily available to those skilled in the art. In order to reduce the effect of stray light reflected back from the surface of the image conduit 23, anti-reflection coating can be coated onto a flat surface of the image conduit 23.

Figure 6:
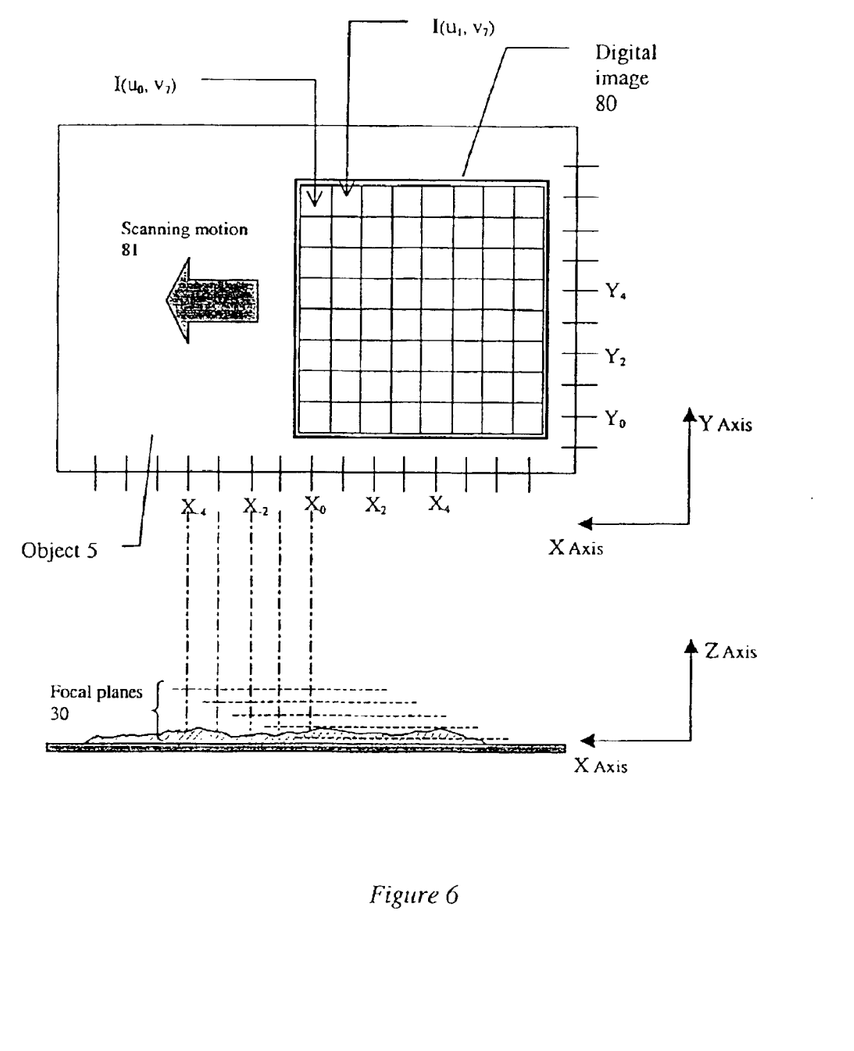
FIG. 6 is an illustration showing the relationship between the image and the object space.
Figure 7:
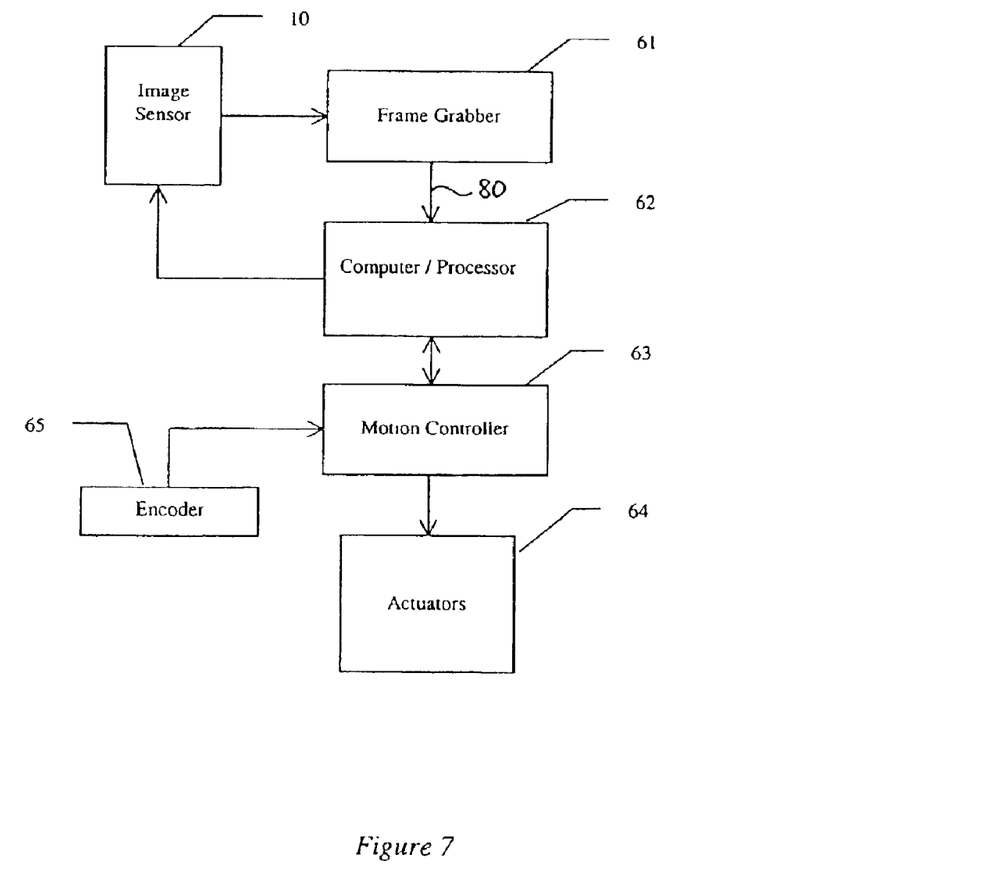
FIG. 7 shows a block diagram of the image sensor, processing and control modules in accordance with the present invention.

Referring to FIGS. 6 and 7, the output of the array image sensor 10 is digitized by the frame grabber 61 to produce a digital image 80. A computer/processor 62 is used to process the digital image 80. The computer/processor 62 also controls the timing of the image acquisition activity of the image sensor 10. The computer/processor 62 further controls a motion controller 63. The motion controller 63 is responsible for the object scanning motion 81 through the actuator 64. The encoder 65 provides accurate position information of the actuator 64 to the motion controller 63.

The confocal imaging system will now be analysed mathematically with particular reference to FIG. 6. The Z axis has already been defined as the height component in the system. The Y axis will now be defined as the axis parallel with the rows of elements 26 of the system. The X axis is therefore the direction perpendicular to the rows of elements 26 and perpendicular to the Z axis. A point on the object will have a 2 dimensional position (X, Y) while a point on the digital image will have a 2 dimensional position (u, v). The intensity of light detected by the detector at position (u, v) in image space may be written as I(u, v). When the confocal imaging system is arranged as shown in FIG. 6, then the point in object space given by $(X_0, Y_0)$ corresponds to an image space coordinate given by $(u_0, v_0)$ and the focal plane of the detection system is given by $Z_0$. At this imaging position, the object points within the field-of-view and their corresponding image coordinates can be written as follows:

| Object space | Image space | Focal plane |
|---|---|---|
| $(X_0, Y_1)$ | $(u_0, v_1)$ | $Z_0$ |
| $(X_1, Y_1)$ | $(u_1, v_1)$ | $Z_1$ |
| . | . | . |
| . | . | . |
| $(X_n, Y_1)$ | $(u_n, v_1)$ | $Z_n$ |

Note that i is the column index.

There are n+1 slices of focal plane in the object space. In other words, each row of the digital image acquires images at different Z heights or focal planes 30.

Next, the optical assembly is incremented by a scanning motion one step (one row) along the X axis and the object points within the field-of-view and their corresponding image coordinates become:

| Object space | Image space | Focal plane |
|---|---|---|
| $(X_1, Y_1)$ | $(u_0, v_1)$ | $Z_0$ |
| $(X_0, Y_1)$ | $(u_1, v_1)$ | $Z_1$ |
| . | . | . |
| . | . | . |
| $(X_{n-1}, Y_1)$ | $(u_n, v_1)$ | $Z_n$ |

When the optical assembly has moved for n steps (n rows), the object point at position $(X_0, Y_0)$ would have been imaged for n+1 times. Each of these images is acquired at different Z slice.

| Object space | Image space | Focal plane |
|---|---|---|
| $(X_n, Y_1)$ | $(u_0, v_1)$ | $Z_0$ |
| $(X_{n+1}, Y_1)$ | $(u_1, v_1)$ | $Z_1$ |

-continued

| Object space | Image space | Focal plane |
|---|---|---|
| . | . | . |
| . | . | . |
| . | . | . |
| $(X_0, Y_1)$ | $(u_n, v_1)$ | $Z_n$ |

The Z coordinate of the object point $(X_0, Y_i)$ can be computed by locating the maximum intensity within these n+1 images $\{I(u_0, v_1), I(u_0, v_i) \ldots, I(u_n, v_1)\}$. Better accuracy can be obtained by fitting a function to the three consecutive highest intensity points and differentiating the function to compute the maximum point. In this way, better resolution can be obtained over the intensities measured at discrete intervals. Quadratic and gaussian are appropriate functions for this type of fit.

When the optical assembly has moved for 2n+1 steps (rows), the Z coordinates of the object points from $(X_1, Y_i)$ to $(X_n, Y_i)$ can be computed in a similar way as $(X_0, Y_1)$.

The confocal imaging system can also scan in the Y direction to inspect positions in object space having Y>7 or Y<0. Preferably, the scanning will be performed in swaths.

Figure 8:
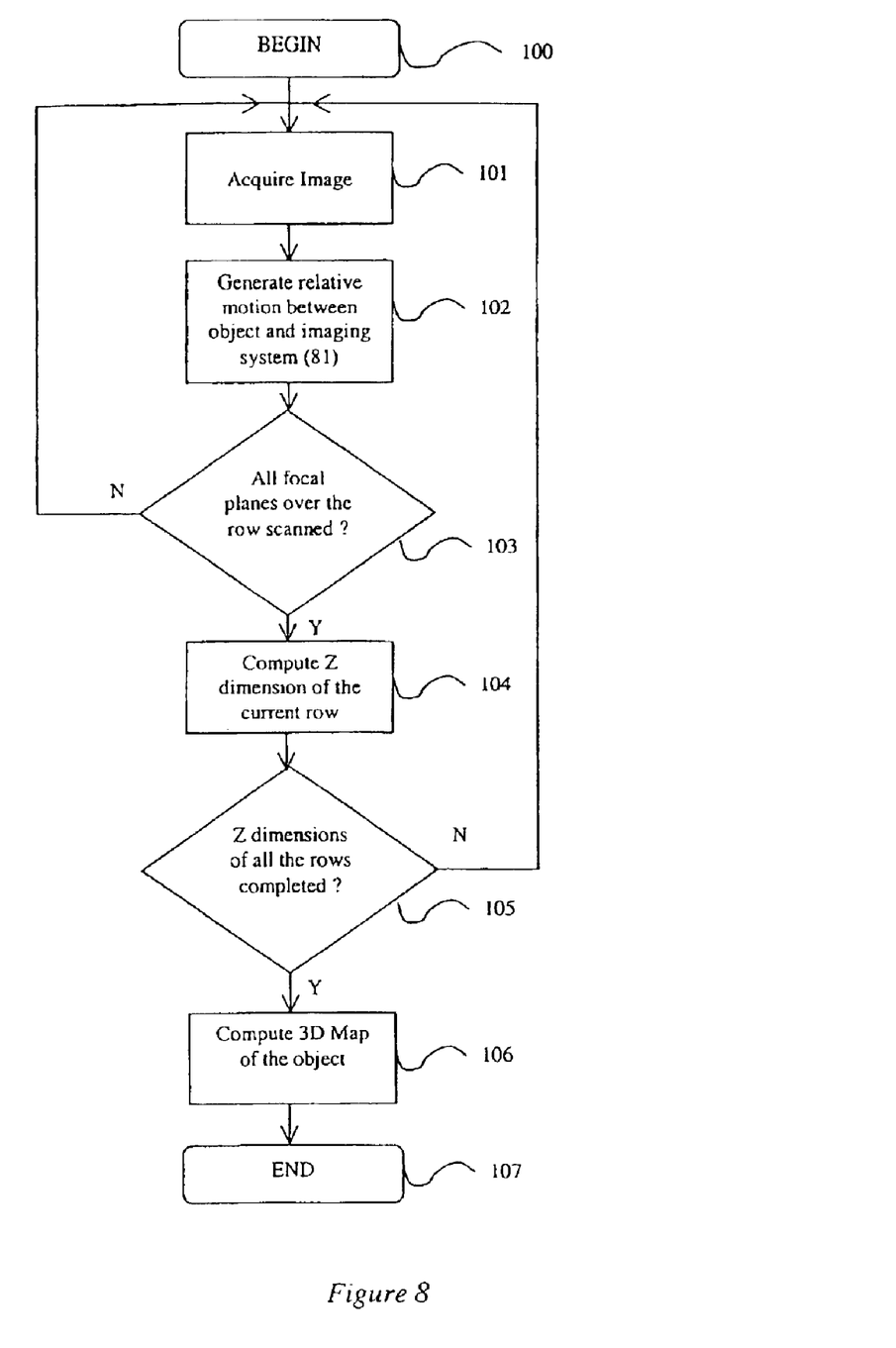
FIG. 8 is a flow chart showing the major steps of computing the 3D map of an object.

The computational flow is illustrated in FIG. 8. At the starting point of the object of interest 5, an image 80 is captured 101. The motion controller 63 then instructs the actuator 64 to scan one additional row 102. Another image 80 will be captured. In this case, one specific row of object points has been scanned twice by two different focal planes 30. Depending on the number of focal planes 30 provided in the confocal imaging system, the processor 62 will move and acquire another image 101 until all the focal planes 30 have been imaged. The z dimension of the specific row of object points can now be computed by locating the maximum intensity in the series of images that have been captured (104). The processor 62 will continue to instruct the actuator 64 to move and acquire further images so that the subsequent rows of object points can be computed in a similarly way (105). This will be repeated until the entire object of interest 5 has been fully covered. A 3D map of the entire object of obtained as a result. 3D data manipulation and decision making ness the 3D data.

What is claimed is:

1. A confocal imaging system for imaging a surface comprising:
   an array sensor having rows of sensors for detecting light emitted from the surface, and
   an optical system comprising an objective lens, and a microlens and pinhole array assembly, the objective lens defining an optical axis of the imaging system and being positioned to focus light from the surface onto the microlens and pinhole array assembly and further onto the array sensor,
   characterised in that the microlens and pinhole array assembly comprises;
   a microlens array,
   a fiber optic faceplate having a first surface adjacent the microlens array, and a second surface slanted relative to the first surface, and
   a pinhole array tilted at an oblique angle relative to the optical axis of the imaging system and positioned adjacent the slanted second surface of the fiber optic faceplate such that light passing through the pinhole array is transmitted through the fiber optic faceplate to the first surface adjacent the microlens array, whereby subsequent rows of pinholes in the pinhole array are staggered at increasing distances along the optical axis of the imaging system and light from different focal planes adjacent the surface is focussed onto different sensor rows of the array sensor.

2. A confocal imaging system according to claim 1, wherein the optical system comprises an imaging lens positioned between the microlens and pinhole array assembly and the array sensor for focussing light transmitted through the pinholes onto the sensors.

3. A confocal imaging system according to claim 1, wherein the array sensor is substantially perpendicular to the optical axis of the imaging system.

4. A confocal imaging system according to claim 1, wherein the optical system comprises a light source arranged to focus light on said different focal planes.

5. A confocal imaging system according to claim 2, wherein the array sensor is substantially perpendicular to the optical axis of the imaging system.

6. A confocal imaging system according to claim 2, where in the optical system comprises a light source arranged to focus light on said different focal planes.

7. A confocal imaging system according to claim 3, where in the optical system comprises a light source arranged to focus light on said different focal planes.

8. A confocal imaging system according to claim 5, there in the optical system comprises a light source arranged to focus light on said different focal planes.

\* \* \* \* \*